US006736319B2

(12) United States Patent
Swanson et al.

(10) Patent No.: US 6,736,319 B2
(45) Date of Patent: May 18, 2004

(54) OPTICAL MARK READER (75) Inventors: Mark R. Swanson, Wisconsin Rapids, WI (US); William C. Apperson, Renton, WA (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 0 days.

(21) Appl. No.: 09/946,411

(22) Filed: Sep. 4, 2001

(65) Prior Publication Data
US 2003/0047607 A1 Mar. 13, 2003

(51) Int. Cl.⁷ .................................................. G06K 7/10
(52) U.S. Cl. ........................ 235/454; 235/456; 235/458; 235/459; 235/460
(58) Field of Search ................................. 235/454, 456, 235/458, 459, 460

(56) References Cited

U.S. PATENT DOCUMENTS

| | | |
|---|---|---|
| 3,619,569 A | 11/1971 | Hoehn et al. |
| 3,941,376 A * | 3/1976 | Liechty et al. .............. 271/275 |
| 4,902,880 A | 2/1990 | Garczynski et al. |
| 5,046,005 A | 9/1991 | Vilardebo et al. |
| 5,085,587 A | 2/1992 | DesForges et al. |
| 5,110,129 A | 5/1992 | Alvarez |
| D335,491 S | 5/1993 | Rolicki |
| 5,345,090 A * | 9/1994 | Hludzinski ................. 235/482 |
| 5,399,845 A | 3/1995 | Manucy, III |
| D368,255 S | 3/1996 | Sasaki et al. |
| 5,569,898 A | 10/1996 | Fisher et al. |
| 5,721,420 A * | 2/1998 | May .......................... 235/379 |
| 5,803,650 A | 9/1998 | Wu |
| 5,895,906 A | 4/1999 | Danielson et al. |
| D413,584 S | 9/1999 | Wu et al. |
| 6,000,607 A | 12/1999 | Ohki et al. |
| 6,015,092 A | 1/2000 | Postlewaite et al. |
| D426,238 S | 6/2000 | Liu |
| 6,070,802 A | 6/2000 | Yi |
| 6,079,624 A | 6/2000 | Apperson et al. |
| 6,095,868 A | 8/2000 | Hyland et al. |
| 6,112,050 A | 8/2000 | George-Morgan |
| 6,357,658 B1 | 3/2002 | Garczynski et al. |

OTHER PUBLICATIONS

Accelerated Math product literature, *Renaissance Learning*, 5 pages, 2001 Catalog.
Optical Mark Readers product literature, *Chatsworth Data Corporation*, 4–pages (Date unknown).
GradeMaster™ product literature, *Apperson Print Management Services*, 4–pages (Date unknown).
Model 888P+ Test Scoring Machine product literature, *Scantron Corporation*, 2–pages (Date unknown).
Scanmark 2000/2250 Optical Mark Readers product literature, *Scantron Corporation*, 2–pages (© 1997).
Scanmark 2000 & 2500 product literature, *Scantron Corporation*, 2–pages (© 1996).
Scanmark 4000 Optical Mark Reader product literature, *Scantron Corporation*, 2–pages (© 1997).

(List continued on next page.)

Primary Examiner—Diane I Lee
Assistant Examiner—Daniel Hess
(74) Attorney, Agent, or Firm—Merchant & Gould P.C.

(57) ABSTRACT

An optical mark reader includes a housing formed by a base and an upper housing assembly. A scanner is associated with the upper housing assembly for performing scanning operations on cards that are input into the housing. The base and the upper housing are detachably connected to each other by a quick connect/disconnect fastening system which permits easy access to the lens of the scanner, whereby the lens can be cleaned as needed. In addition, the housing includes a unique card path defined, in part, by a pair of guide walls on the base. The card path includes an inlet that is tapered both vertically and horizontally make insertion of cards into the housing easier. Further, a single, offset drive wheel is used to transport cards through the housing.

20 Claims, 6 Drawing Sheets

OTHER PUBLICATIONS

EZ Scan™ product literature, *Peripheral Dynamics Inc*, 2–pages (Date Unknown).

PAGESCAN II product literature, *Peripheral Dynamics Inc.*, 2–pages (Date Unknown).

PAGESCAN product literature, *Peripheral Dynamics Inc.*, 2–pages (Date Unknown).

Optical Mark–Sense Sampling Scanner Model 138, 8 pages at http://www.pdiscan.com/oms_model138.html (Date printed, Feb. 2, 2000).

Printout from Peripheral Dynamics Inc. website, 8 pages at http://www.pdiscan.com (Date printed, Sep. 21, 2001).

The SR–200 Hand–fed OMR Card Reader product literature, *Scanning™ Systems*, 2–pages (Date unknown).

The SR–307 Card Reading by Design product literature, *Scanning Systems®* 2–pages (Date unknown).

The SR–380 product literature, *Scanning™ Systems*, 2–pages (Date unknown).

The SR–607 product literature, *Scanning® Systems*, 2–pages (5/96).

SR–700 Series product literature, *Scanning Systems®*, 2–pages (3/98).

The SR–9100 and SR–9700 High Performance OMR Scanning product literature, *Scanning™ Systems* 2–pages (Date Unknown).

OpScan® 3 OMR Scanner product literature, *National Computer Systems, Inc.*, 2–pages (6/98).

ACP2100 Optical Mark Reader product literature, *Chatsworth Data Corporation*, printed from http://www.omrsys.com/custom_omr_acp2100.htm, 4 pages (Date printed, Jul. 19, 2001).

CD800 Optical Mark Reader product literature, printed from http://www.trrsimage.com/DRS/cd800.htm, DRS, 1 page (Date printed, Jul. 19, 2001).

CD230 Optical Mark Reader product literature, printed from http://www.trrsimage.com/DRS/cd230.htm, DRS, 1 page (Date printed, Jul. 19, 2001).

* cited by examiner

OPTICAL MARK READER

FIELD OF THE INVENTION

This invention relates to optical mark readers. In particular, this invention relates to an improved optical mark reader for use in reading marked cards, including test cards, lottery game cards, and similar type cards that contain "bubble" or like marks which are filled in with a suitable writing instrument by a user.

BACKGROUND OF THE INVENTION

Optical mark readers, also known as optical mark recognition devices and bubble card readers, are known in the art. These types of readers are used in a variety of fields, including education and gaming, to read pencil or pen marks that are placed onto a card by a user filling in pre-printed "bubbles" on the card. Optical mark readers are typically designed as peripheral units that interface with a local controller, such as a local personal computer, which receives and processes data from the reader, or designed as stand alone units which read and process data within the reader. They may also be connected to local area networks, or even global networks, with suitable interconnection devices.

In the education field, an optical mark reader needs to be highly accurate and reliable in order to provide reliable scoring of test results and the like. Further, the continuing rise in education costs and shrinking education budgets require that the cost of an optical mark reader be as low as possible to allow continued use of such devices within the classroom or school. Moreover, students are often the most frequent users of such readers. Therefore, an optical mark reader should be designed so that it is easy to use.

In some existing optical mark reader designs, the readers are constructed with a large number of parts, including parts that require special manufacturing, thereby increasing the costs of the readers. In addition, the parts are often assembled by hand in assembly line fashion by workers, which further increases costs. A reduction in, and simplification of, the parts of the reader would not only reduce parts costs, but would also reduce manufacturing costs, simplify assembly, improve reliability, and reduce reader size.

Further, many previous optical mark readers have been designed with a relatively narrow input slot through which a card to be read is inserted. Due to the narrow construction of the input slot, the card must be aligned precisely with the slot in order to achieve insertion. However, achieving this level of alignment is time consuming, and can be difficult for some individuals, such as children.

There is a continuing need for an improved optical mark reader that overcomes the aforementioned problems of prior optical mark readers as well as other problems existing with prior art readers.

SUMMARY OF THE INVENTION

The invention provides an improved optical mark reader for use in reading or scanning bubble cards. The reader has a reduced number of parts compared to conventional readers, and is simpler to construct and assemble. Moreover, the reader is designed without threaded fasteners. Instead, the reader components are secured to each other using attachment devices that are integral with the various components.

In one aspect of the invention, an optical mark reader is provided. The reader includes a base and an upper housing assembly that define a card path along which a card to be read travels. The base and the upper housing are detachably connected to each other by a quick connect/disconnect fastening system that is integral with the base and the upper housing assembly. By making the base and upper housing assembly readily detachable, debris can be readily removed from the scanning lens and card jams cleared by the reader user, without having the reader serviced by service personnel, and without using cleaning cards which can be expensive. Further, disconnection can be achieved without using tools.

In another aspect of the invention, an optical mark reader is provided that includes a housing having a card path along which a card to be read travels. A scanner is associated with the housing. Further, the card path includes an inlet, and the card path is defined at least in part by a pair of guide walls that are positioned opposite each other, with the guide walls having a height that varies from the inlet to the scanner.

In yet another aspect of the invention, an optical mark reader is provided that includes a housing having a card path along which a card to be read travels. A scanner associated with the housing. The card path includes a tapered inlet through which a card to be read is inserted into the housing, and the inlet tapers both vertically and horizontally. The tapered construction of the inlet makes insertion of a card into the housing easier since a larger insertion area is provided and the taper guides the forward edge of the card into proper alignment for subsequent reading.

In still another aspect of the invention, an optical mark reader for reading bubble cards is provided. The reader includes a housing having a card path along which a card to be read travels. The card path is defined by a pair of guide walls that are spaced apart along at least a portion of the guide path by a distance that is minimally greater than the width of a bubble card. In addition, a scanner is associated with the housing for scanning a card input into the housing. Further, a drive mechanism within the housing transports a card along the card path and through the housing. The drive mechanism includes a single drive wheel disposed adjacent to the scanner and positioned at a decentralized location of the card path. By locating the drive wheel at a decentralized location of the card path, the drive wheel is able to engage a decentralized region of the card where marking does not generally occur. Therefore, the drive wheel will not smear or mar markings on the card, which can potentially lead to inaccurate scanning results.

For a better understanding of the invention, its advantages and objects obtained by its use, reference should be made to the drawings which form a further part hereof, and to the accompanying description, in which there is described a preferred embodiment of the invention.

DETAILED DESCRIPTION OF THE PREFERRED EMBODIMENT

Figure 1:
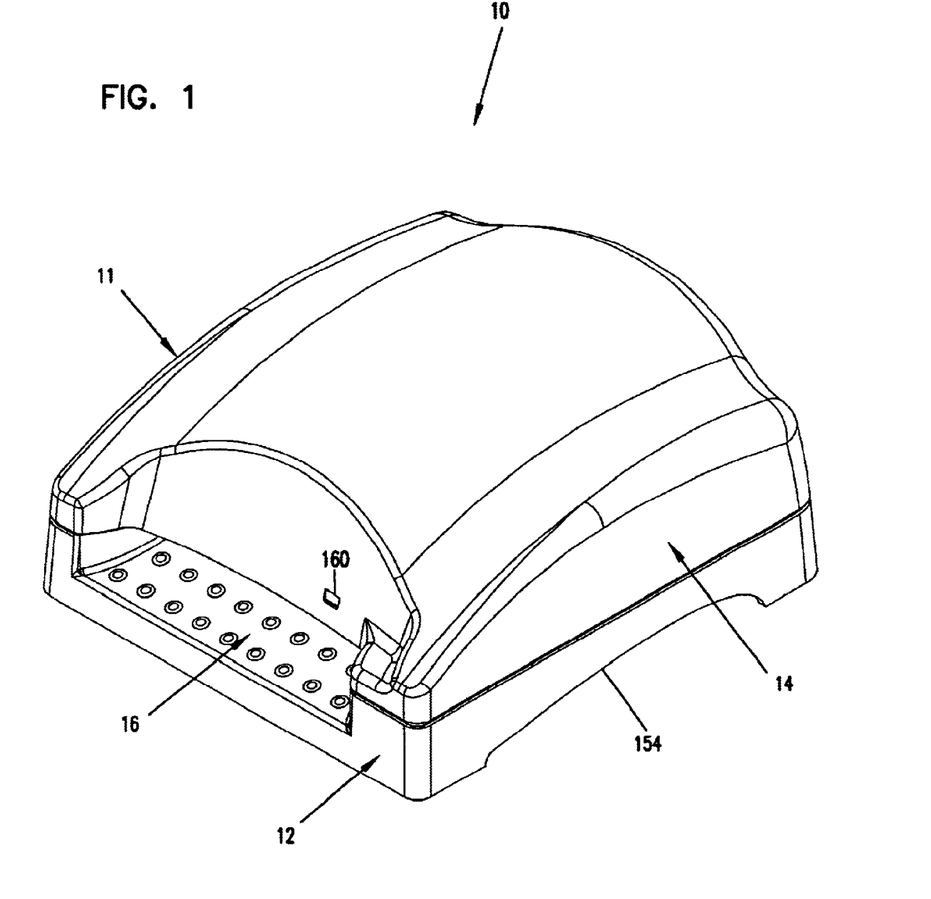
FIG. 1 is a perspective view of the optical mark reader of the present invention.

A preferred embodiment of an optical mark reader 10 according to the invention is illustrated in FIG. 1. In use, the reader 10 is designed to read or scan marked cards that are fed into and through the reader 10. Marked cards typically contain ovals, squares, rectangles or the like, referred to herein generically as "bubbles", some of which are filled in by a user with a suitable writing instrument, such as a pencil or pen. Examples of such cards include student test cards, lottery cards that are used to indicate desired lottery numbers, voting ballots, and the like. These types of cards are well known in the art and no further description thereof is provided. The preferred embodiment of the reader 10 will be described in relation to the scanning of bubble test cards. However, it is to be realized that the reader 10 can be used to scan other types of marked cards as well. A preferred embodiment of a test card for use with the reader of the present invention is disclosed in copending patent application Ser. No. 09/946,800, filed on Sep. 4, 2001.

The reader 10 is preferably configured as a peripheral device that interfaces with a personal computer (PC) via a suitable communication interface, such as via a cable. The PC preferably includes software, of a type known in the art, for receiving, analyzing and interpreting data that is scanned from the test card by the reader 10, as well as controlling the operation of the reader 10. The reader 10 could also interface with the PC via suitable wireless technology of a type known in the art. In addition, the reader 10 could also be interconnected to a local area network, a wide area network, or even a global network through a suitable interconnection device, such as a modem.

Moreover, the use of bubble card scanners for use in selling lottery tickets at terminals in retail stores that read marked cards indicating the lottery player's number selections is well known in the art, as is the use of suitable communication techniques by which the terminals communicate with a remote location.

Returning to FIG. 1, the reader 10 is seen to include a housing 11 that comprises a base 12 and an upper housing assembly 14 disposed on top of the base 12. Preferably, the base 12 and upper housing assembly 14 are detachably connected together via a quick connect/disconnect fastening system, to be later described. Often times ink, correction fluid, and other debris can get onto the scanning lens of a reader and thereby impair operation of the reader. In addition, test cards can occasionally become jammed during scanning. By making the assembly 14 readily disconnectable from the base 12, the lens on the assembly 14 can be readily cleaned by the user of the reader 10, and jams or debris can be cleared. Further, disconnection can be achieved without using tools. On the other hand, conventional readers have had to utilize cleaning cards that are run through the reader, have to be sent back to the manufacturer or other service personnel, or require tools to disassemble the reader to access the scanning area, when cleaning of the scanning lens was necessary.

In addition, the base 12 and assembly 14 cooperate to define an input slot 16, seen in FIG. 1, through which test cards to be scanned are fed one at a time. The input slot 16 is designed to facilitate insertion of cards into the reader 10. In particular, the left and right sides of the input slot 16 are constructed so as to make insertion of a card easier. Further, the height of the input slot 16 is made larger than in conventional readers, which also contributes to easier card insertion. The specific construction of the input slot 16 will become apparent from the description of FIGS. 2–3. The reader 10 also includes an output slot (not visible in FIG. 1) that is positioned on the opposite side of the reader from the input slot 16.

Moreover, the reader 10 of the invention is designed with a reduced number of parts when compared to conventional readers. In addition, the components of the reader 10 are detachably connected together without the use of threaded fasteners, such as screws. The reduced number of parts and elimination of threaded fasteners reduces parts costs and assembly costs for the reader 10, renders the reader 10 smaller and lighter than conventional readers, and improves the reliability of the reader.

Figure 2:
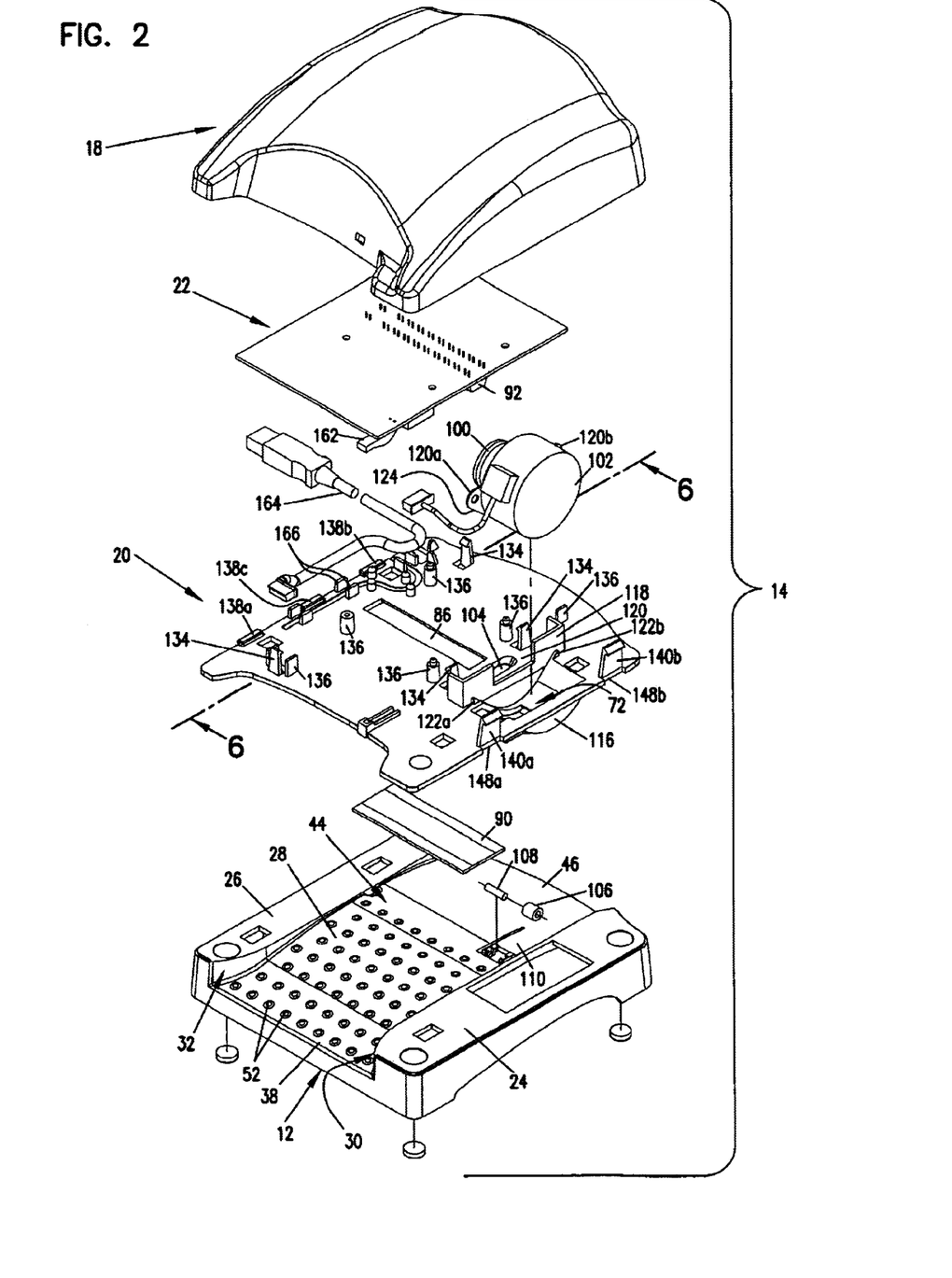
FIG. 2 is an exploded view of the parts of the optical mark reader in FIG. 1.

Turning now to FIG. 2, the upper housing assembly 14 is seen to include a lid 18, a chassis 20 that detachably connects to the lid 18 and a circuit board 22 that detachably connects to the chassis 20. The base 12, lid 18, and chassis 20 are preferably constructed from molded plastic, although these parts could be made of other materials, such as metal, if desired.

Figure 3:
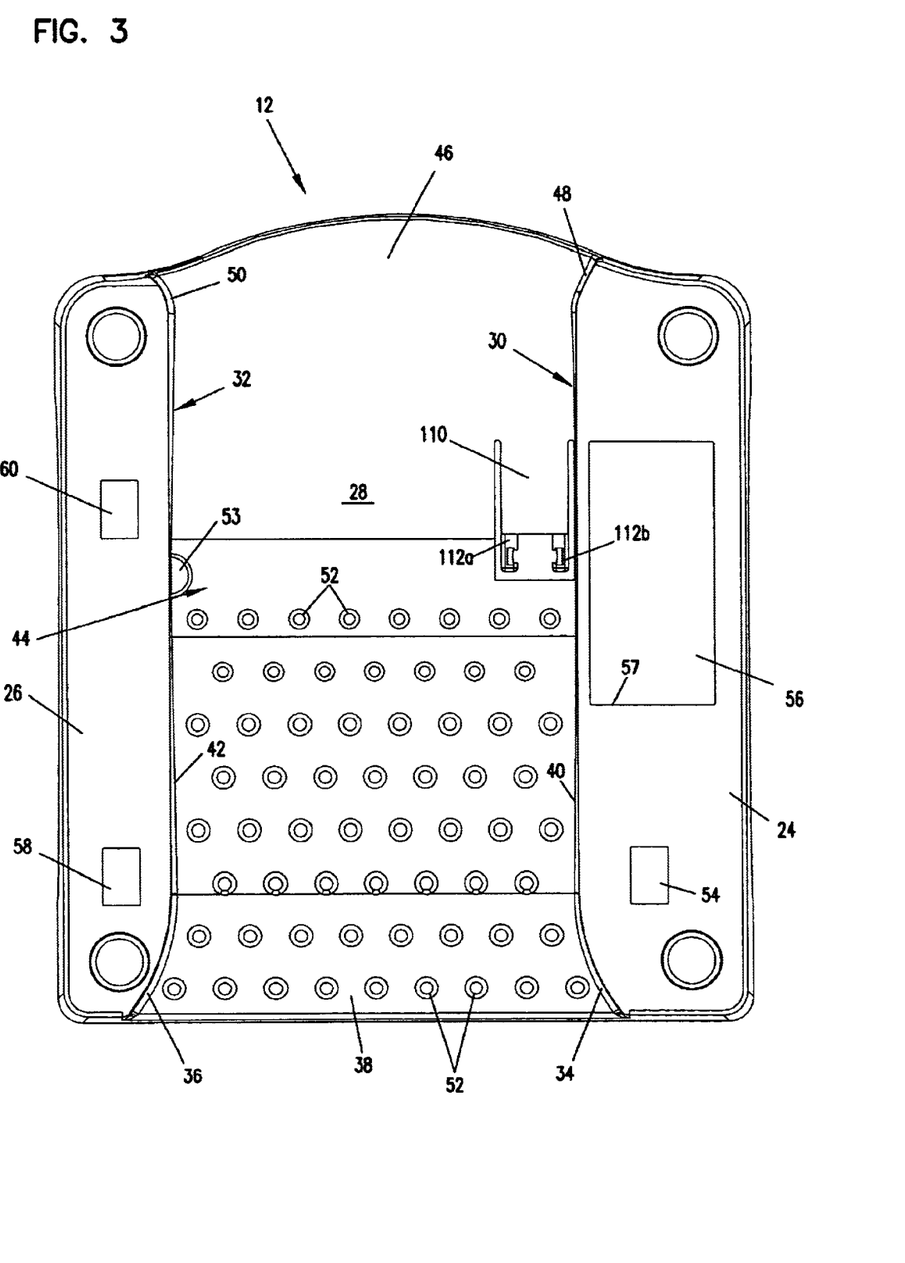
FIG. 3 is a top view of the reader base.

The base 12, as illustrated in FIGS. 2 and 3, includes right and left legs 24, 26 between which is a surface 28. The surface 28 is below the level of the upper surface of the legs 24, 26, so that right and left guide walls 30, 32 are formed between the surface 28 and the legs 24, 26. As a test card enters and goes through the reader 10, the card generally slides along and is supported by the surface 28, between the two guide walls 30, 32. The surface 28 includes the projections to be later described.

The guide walls 30, 32 are designed to minimize left and right shifting, when viewing FIG. 3, of the test card as the card travels through the scanner. It is important that such movement be minimized in order to achieve adequate read results. The scanning mechanism, to be later described, is positioned to read specific portions of the bubbles on the test card. Shifting of the card within the reader 10 would result in a slight offset between the scanning mechanism and the intended portions of the card to be read. This offset can result in scanning errors. The guide walls 30, 32, which will now be described, minimizes such shifting in order to maintain proper alignment.

As best seen in FIG. 3, the guide walls 30, 32 have arcuate flared sections 34, 36 at an inlet end 38 of the surface 28. The flared sections 34, 36 define a throat of decreasing width, with the wide end of the throat facing outward and providing a wide target for insertion of a test card. The gradually narrowing throat helps to guide a test card into proper insertion position as it is being inserted into the reader 10.

As further seen in FIG. 3, starting from the narrow end of the flared sections 34, 36, the guide walls 30, 32 include linear sections 40, 42 that extend over a substantial portion of the length of the base 12. The spacing between the linear sections 40, 42 of the guide walls 30, 32 is only slightly greater than the width of a test card, so that little or no right/left shifting of the test card occurs during reading. As a result, the linear sections 40, 42 maintain the proper right/left positioning of a test card as it progresses through the reader 10. In addition, the length of the linear sections 40, 42 between the narrow end of the flared sections 34, 36 and the region 44 of the surface 28 where scanning occurs is such that the test card is properly aligned and is unable to shift right or left once the front edge of the test card reaches the scanning region 44. Likewise, the linear sections 40, 42 extend for a significant length beyond the scanning region 44 such that the test card is maintained in its proper alignment up to the end of scanning. At an outlet end 46 of the surface 28, the guide walls 30, 32 have outwardly flared sections 48, 50 at the end of the linear sections 40, 42.

With reference to FIG. 2, the surface 28 is convex between the inlet end 38 and the outlet end 46. Because the surface 28 is convex, the guide walls 30, 32 are higher adjacent the inlet and outlet ends 38, 46 than they are at the scanning region 44, as is seen in FIG. 2. The input slot 16, which is defined generally by the inlet end 38 of the surface 28, the flared sections 34, 36 of the guide walls 30, 32, and the bottom surface of the assembly 14, thus has a throat-like shape, with tapered right and left sides, and a tapered vertical dimension as best seen in FIG. 1. This shape makes insertion of a test card into the reader easier, as a larger area is provided into which the card can be inserted, with the shape of the slot 16 guiding the card into correct position after initial insertion. Conventional readers typically have a relatively small slot into which a card must be inserted, which makes insertion difficult.

The apex of the convex surface 28 is at the scanning region 44, as is apparent from FIGS. 2 and 3. At the apex, the surface 28 is only slightly below the upper surface of the legs 24, 26 (i.e. the guide walls 30, 32 have minimal height), so that the test card is brought as close as possible to the scanner in the assembly 14 to improve the scanning results. After the scanning region 44, the surface 28 again slopes downward toward the outlet end 46. This downward sloping facilitates discharge of a test card from the reader 10 after scanning is complete.

As further shown in FIGS. 2 and 3, the surface 28 is formed with a plurality of projections or bumps 52 starting from the inlet end 38 and ending just prior to the scanning region 44. The bumps 52 decrease the friction between the surface 28 and the test cards by decreasing the contact area between the surface 28 and the cards, thereby providing smoother card feeding and reducing the number of card jams.

Moreover, a well or depression 53 is formed in the surface 28 at the left side of the scanning region 44, as shown in FIG. 3. The well 53 is positioned opposite a timing mark sensor (not shown) that forms part of the scanning mechanism to be later described. The inventors have discovered that the well 53 provides a truer reading of the timing mark sensor to determine the presence or absence of a card in the reader 10. It is believed that the well 53 helps to scatter light from the timing mark sensor when no card is present, thereby increasing the likelihood that the sensor does not incorrectly indicate that a card is present. When a card is present and covers the well 53, the timing mark sensor is able to sense the card so that the reader 10 knows that a card is present.

With reference now to FIGS. 2–5, the quick connect/disconnect fastening system whereby the assembly 14 is detachably connected to the base 12 will now be described. The fastening system is preferably a bayonet-type coupling, as will be apparent from the following description.

FIG. 3 shows that the leg 24 of the base 12 is provided with a first relatively small slot 54 and a second, larger slot 56, while the leg 26 is provided with first and second slots 58, 60 each having the same size as the slot 54.

Figures 5, 6:
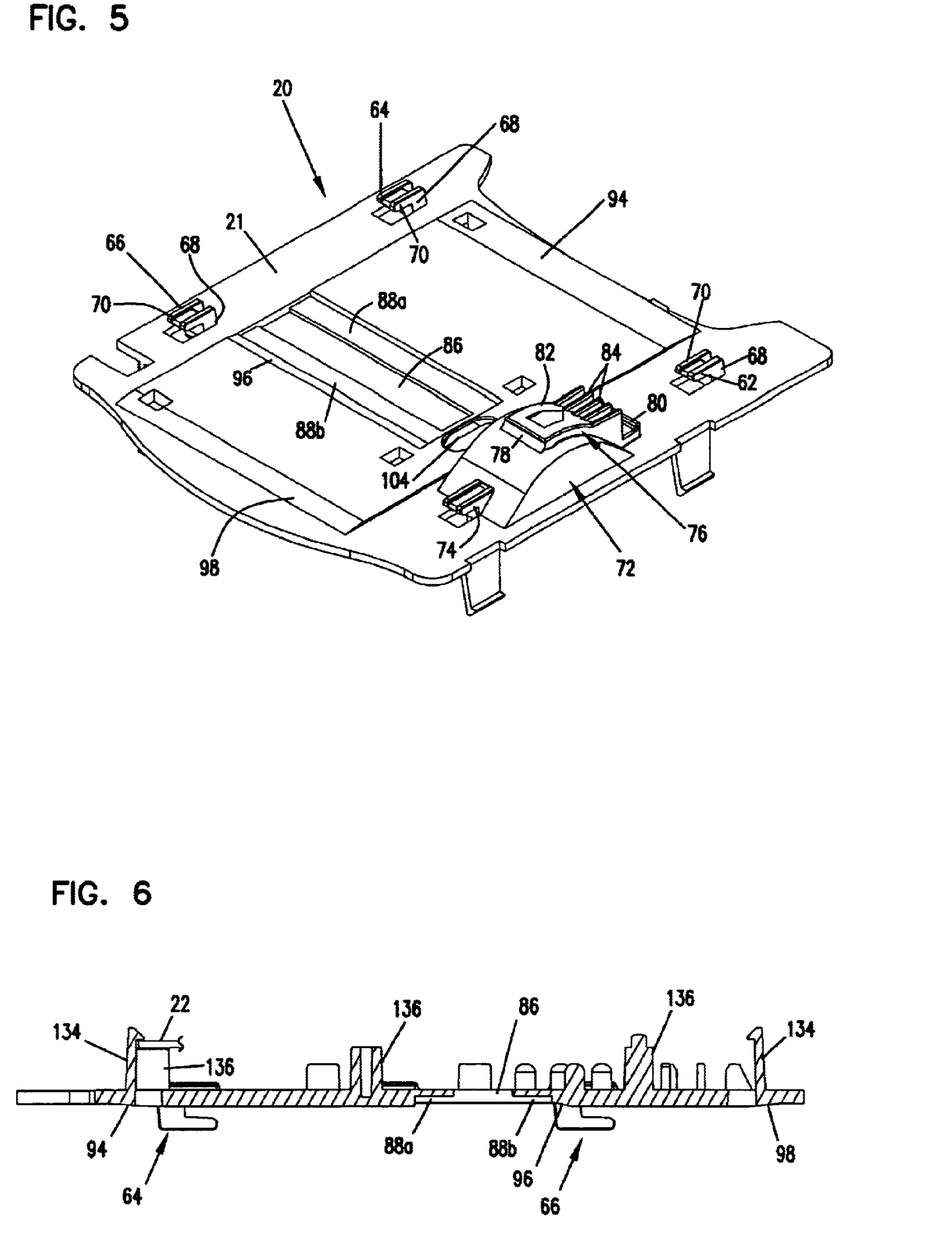
FIG. 5 is a detailed perspective view of the card facing side of the reader chassis.
FIG. 6 is a cross-sectional view taken along line 6—6 in FIG. 2.

In addition, as best seen in FIG. 5, the surface 21 of the chassis 20 that, in use, faces downward toward the base 12 is provided with flanges 62, 64, 66 that are positioned and sized to cooperate with the slots 54, 58, 60, respectively. Preferably, the flanges 62, 64, 66 are integrally formed with the chassis 20 and each flange includes a first portion 68 extending downward from the surface 21 and a second portion 70 extending from the end of the first portion 68 toward the back end of the chassis 20. The length and width of each portion 70 is less than the length and width of each corresponding slot 54, 58, 60, to allow each portion 70 to fit in and through the corresponding slot.

With reference to FIGS. 2 and 5, the surface 21 is also formed with a cup-shaped depression 72, the purpose of which will become apparent later in this description. The depression 72 is positioned and sized to cooperate with the slot 56 in the base 12 in a manner to be later described. A flange 74 is connected to one end of the depression 72. The function of the flange 74 is similar to the function of the flanges 62, 64, 66 which will be described below.

Figure 4:
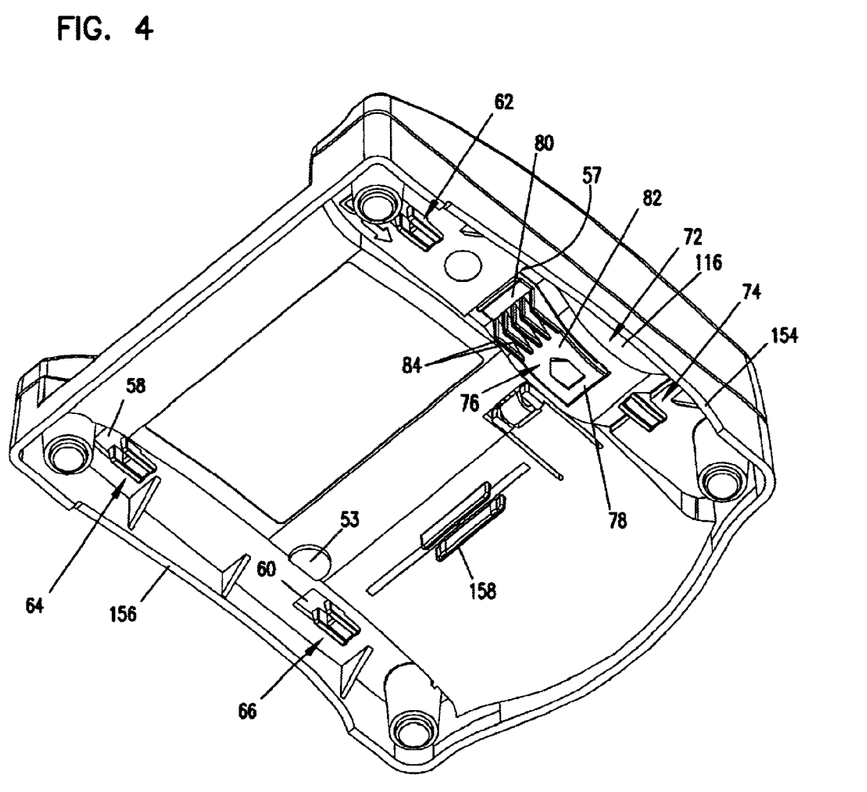
FIG. 4 is a perspective view of the bottom of the optical mark reader.

In addition, as best seen in FIGS. 4 and 5, a resilient lever 76 is connected to the depression 72 and is movable within a correspondingly shaped cut-out formed in the depression 72 and in a portion of the chassis 20. Preferably, the lever 76 is integrally connected to the depression 72 at a hinged end 78 thereof. An opposite, free end 80 of the lever 76 is movable upwardly and downwardly in the cut-out, and the end 80 is biased by the resiliency of the hinged end 78 to a position where the end 80 projects above the surface 21 of the chassis 20 as can be seen in FIG. 5. A central portion 82 of the lever 76 between the hinged end 78 and free end 80 is curved to generally match the curvature of the depression 72. A series of ribs 84 extend across the central portion 82 adjacent the free end 80, with the bottom surfaces of the ribs 84 extending generally parallel to the chassis surface 21 to form an actuating surface. By pressing on the actuating surface formed by the ribs 84 in the direction of the arrow in FIG. 5, the free end 80 can be forced downward below the level of the surface 21. When the pressing force is released, the free end 80 is returned back to its initial position by the resilient biasing force of the hinged end 78.

In use, the chassis 20, which is part of the upper housing assembly 14, is oriented such that the surface 21 faces toward the base 12, the flanges 62, 64, 66 are aligned with their respective slots 54, 58, 60, and the depression 72 is aligned with the slot 56. The distance between the free end of the flange 74 and the vertical surfaces of the ribs 84 is less than the length of the slot 56, and the width of the depression 72 is less than the width of the slot 56 to allow the depression 72 and flange 74 to fit in and through the slot 56. The assembly 14 is brought toward the base 12 so that the flanges 62, 64, 66 extend through the slots 54, 58, 60, and the depression 72 and flange 74 extend through the slot 56, as seen in FIG. 4. The assembly 14 is then slid relative to the base 12 in a direction toward the rear of the base 12.

As a result, as shown in FIG. 4, the second portion 70 of the flanges 62, 64, 66 and the flange 74 extend underneath the bottom surface of the base 12. At the same time, the free end 80 of the lever 76 clears the forward edge 57 of the slot 56 and springs downward behind the edge 57. The assembly 14 is thus detachably fixed to the base 12, with relative vertical movement prevented by the flanges 62, 64, 66, 74 engaging the bottom surface of the base 12, and the free end 80 of the lever 76 engaging the front edge 57 of the slot 56 to prevent relative forward sliding movement. Rearward movement is prevented by the portions 68 of the flanges 62, 64, 66 and the base of the flange 74 engaging the rear edges of the respective slots 54, 58, 60 and 56, as shown in FIG. 4. To disconnect the assembly 14 and base 12, the free end 80 of the lever 76 must be pushed in the direction of the arrow by pressing on the actuating surfaces of the ribs 84 until the free end 80 clears the front edge 57 of the slot 56. The assembly 14 can then be slid relative to the base 12 toward the front of the base 12 until the flanges 62, 64, 66 are aligned with their respective slots 54, 58, 60, to allow removal of the assembly 14.

It will be understood that in certain constructions, the base 12 could be provided with flanges while the upper housing assembly 14 is provided with the corresponding slots, so as to form the bayonet-type coupling between the base 12 and the assembly 14.

As shown in FIGS. 5 and 6, the chassis 20 further includes a slot 86 formed therethrough, and recessed depressions 88a, 88b formed in the surface 21 on either side of the slot 86. The recessed depressions 88a, 88b receive therein a lens 90 (shown in FIG. 2), which covers the slot 86. The lens 90 is secured in place by, preferably, a suitable adhesive, or other suitable securement means. When in place, the lens 90 is recessed below the surface 21 to prevent contact between the cards and the lens 90 thereby minimizing scratching of the lens by the cards.

The slot 86 and lens 90 form a scanning window through which scanning operations during operation of the reader 10 are performed, with the lens providing protection for a scanning mechanism 92 (partially visible in FIG. 2) on the circuit board 22. The scanning window is aligned with the scanning mechanism 92. The scanning mechanism 92 is preferably an light emitting diode (LED) scanner containing a linear array of LED's and photosensors that are arranged to scan all potential marking portions of the test cards. LED scanners of this type are known in the art. It is to be understood that other types of scanning mechanisms could also be used. A preferred scanning mechanism for use in the reader 10 is disclosed in copending patent application Ser. No. 09/946,797, filed on Sep. 4, 2001.

The surface 21 of the chassis 20 is designed to facilitate movement of test cards along the surface 21 and prevent cards from becoming snagged or caught on the surface 21. As shown in FIGS. 5 and 6, the surface 21 includes a first sloped region 94 adjacent the front edge of the chassis 20 to guide the forward edge of a test card. In addition, a second sloped region 96 is provided between the recessed depression 88b and the surface 21. The second sloped region 96 prevents the forward edge of a test card from being caught on the joint between the recessed lens 90 that is disposed in the depression 88b and the surface 21. A third sloped region 98 adjacent the rear of the chassis 20 prevents the forward edge of the card from being snagged as the forward edge starts to exit from the reader 10.

The reader 10 of the present invention is also designed with a unique drive mechanism that avoids contact with the marking portions of the test cards. In many conventional readers, the drive mechanisms are constructed so that they extend across and engage a substantial portion of the width of the test card, including portions of the card that are to be marked. As a result, a marking on the test card can become smeared or otherwise marred by the drive mechanism. In addition, the drive mechanism can pick up portions of the writing material (e.g. graphite, ink, etc.) on a mark which can lead to stray markings on other portions of the test card. This can lead to inaccurate scanning results in the event that the stray markings are scanned by the reader, or the reader is unable to read marks that have become marred. By avoiding contact between the drive mechanism and the marked portions of the test cards, stray markings and marring of existing marks can be avoided.

Even if the drive mechanism is designed to contact the card in the spaces between the bubbles on the card, marks applied by the user in these areas are common throughout the central portion of the card. Such stray marks can occur even in the spaces between the bubbles. These stray marks can dirty the drive mechanism and can be "tracked" or reproduced elsewhere on the card by subsequent contact between the drive mechanism and the card.

By locating the drive mechanism away from the centralized area where marking generally occurs, these problems can be reduced or overcome. With reference to FIG. 2, the drive mechanism of the reader 10 includes a single drive wheel 100 that is driven by an electric motor 102. The chassis 20 is provided with a drive wheel slot 104 (also shown in FIG. 5) that is positioned to the side of, and between, the scanning window slot 86 and the depression 72. In use, the motor 102 is positioned in and supported by the depression 72, with the drive wheel 100 being received by the slot 104 so that a portion of the drive wheel 100 extends below the chassis 20 for driving engagement with the test cards.

The position of the drive wheel 100 is such that it engages a decentralized portion of each card outside any normal marking area of the card, thereby eliminating or reducing smearing of marks and unintentional marks on the cards caused by the drive wheel. In addition, the positioning of the drive wheel 100 adjacent the scanning slot 86 is important. Because only a single drive wheel 100 is used, the drive wheel must still be engaged with the test card when scanning is complete in order to permit the wheel to reverse the direction of the test card to enable the card to be driven back through the inlet in the event of an error or to allow the card to be re-read. Further, locating the drive wheel adjacent the scanner permits the top margin that is provided on the test cards to be reduced, thereby allowing an increase in the number of bubble rows that can be provided on the cards. Positioning the drive wheel 100 to far ahead of the scanning slot would mean that once the last bubble line is read by the scanner, the test card may no longer be engaged with the drive wheel, thereby preventing reversal of the card. Positioning the drive wheel 100 to far to the rear of the scanning slot would mean that the forward edge of the card has to be inserted by hand past the scanning position, until the forward edge is engaged by the drive wheel. As a result, the first bubble mark would have to be moved back from the forward edge, thereby increasing the top margin of the card and reducing the number of bubble rows, so that scanning does not occur until the drive wheel engages the card. By positioning the drive wheel adjacent the scanning slot, the card can be inserted and the forward edge grabbed by the drive roller, while allowing scanning to commence adjacent the forward edge of the card.

The motor 102 is preferably a reversible stepper motor to allow cards to be driven forward and backward through the reader 10 with precision. Other types of motors can be used as well, provided they are capable of forward and backward rotation.

It is to be understood that a decentralized location for the single drive wheel 100 might cause the card to skew or twist on its path through the scanner as thrust is applied to the card away from its center of gravity. However, proper construction and sizing of the guide walls 30, 32 as described above overcomes this problem by preventing skewing of the card.

Positioned on the base 12 opposite the drive wheel 100 is an idler roller 106 (see FIG. 2). Test cards are clamped between the idler roller 106 and the drive roller 100 as cards are driven through the reader 10. In the preferred construction, the idler roller 106 is mounted so as to provide a small upward bias force towards the drive wheel 100. To achieve this upward bias force the idler roller 106 is rotatably mounted on a pin 108 at the free end of a lever 110 that is integrally formed with the base 12, as shown in FIGS. 2 and 3. The pin 108 is supported in a pair of flanges 112a, 112b that are integrally connected to the lever 110. It is to be realized that other means of mounting the idler roller 106 opposite the drive wheel could also be utilized.

The motor 102 is mounted and fixed without the use of threaded fasteners or the like. Instead, the motor 102 is securely held in place by structures integral to the components of the assembly 14.

As indicated, the motor 102 is partially disposed within and supported by the depression 72. Referring to FIG. 2, the depression 72 includes an end wall 116 that will be positioned closely adjacent the corresponding end of the motor 102. In addition, a wall 118 extends upwardly from the upper surface of the chassis 20 next to the depression 72. The wall 118 is positioned closely adjacent the corresponding end of the motor 102, and includes a central cut-out 120 to allow passage of the motor shaft connected to the drive wheel 100. Due to the close positioning of the walls 116, 118, side-to-side shifting of the motor 102 is substantially prevented.

Further, the motor 102 is mounted whereby forward and backward movement, as well as rotational movement, is substantially prevented. FIG. 2 shows the motor 102 as including a pair of flanges 120a, 120b adjacent one end thereof (the flange 120b is only partially visible in FIG. 2). The flanges 120a, 120b are normally used for mounting the motor 102 via fasteners. However, the flanges in Applicant's design are used without fasteners to mount the motor. As shown in FIG. 2, the upper surface of the chassis 20 is formed with a pair of flanges 122a, 122b that abut against the wall 118 and have surfaces that continue upward from the surface of the depression 72. The motor flange 120a includes a bottom surface 124 that rests on the surface of the flange 122a when the motor 102 is disposed within the depression 72. The flange 120b includes a similar bottom surface (not visible) that rests of the surface of the flange 122b. Due to the contact between the flanges 120a, 120b and the flanges 122a, 122b, rotation of the motor 102 within the depression 72 is prevented.

Figure 7:
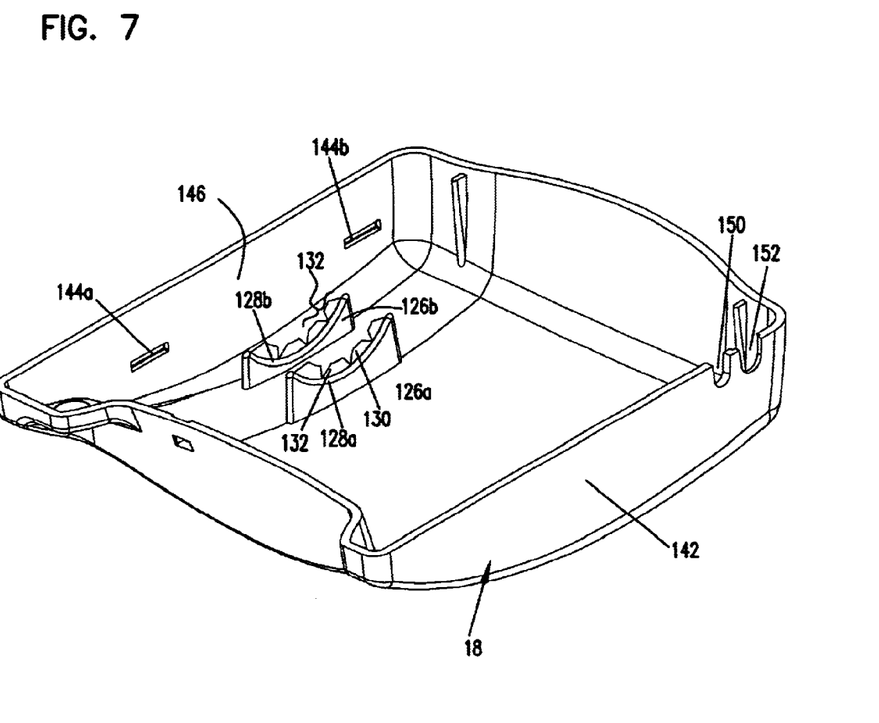
FIG. 7 is a perspective view illustrating details of the underside of the reader lid.

Moreover, the lid 18 includes features that cooperate with the motor 102 to help securely mount the motor 102 within the reader 10. With reference to FIG. 7, the lid 18 is provided with a pair of integrally formed ribs 126a, 126b on the inner surface thereof. The ribs 126a, 126b project generally vertically downward from the inner surface at locations that allow them to cooperate with the outer surface of the motor 102. The ribs 126a, 126b each have a bottom edge 128a, 128b with a curvature that corresponds generally to the outer surface of the motor 102. The edges 128a, 128b are designed to engage the upper, outer surface of the motor 102 when the lid 18 is in place to help clamp and hold the motor in place.

It is difficult to form the ribs 126a, 126b and edges 128a, 128b with exact dimensions so that adequate engagement with the upper, outer surface of the motor 102 results. To account for such difficulties and reduce the need to form the ribs and their edges with exacting dimensions, the ribs 126a, 126b, which are preferably integrally molded with the lid 18 from a suitable plastic material, are formed with a slight strip of plastic 130 on the edges 128a, 128b as shown in FIG. 7. The strip 130 is preferably notched along the length thereof to form a plurality of crush ribs 132 along each rib 126a, 126b. When the lid 18 is brought into position, the strip 130 engages the upper, outer surface of the motor 102, with the crush ribs 132 allowing the strip 130 to crush where appropriate so that a tight fit between the ribs 126a, 126b and the outer surface of the motor 102 is achieved.

As described earlier, the chassis 20 detachably connects to the lid 18 and the circuit board 22 detachably connects to the chassis 20. These detachable connections are achieved without the use of threaded fasteners or the like. The mechanisms for detachably connecting these components will now be described.

As shown in FIGS. 2 and 6, a plurality of resilient clamp fingers 134 are integrally formed on the upper surface of the chassis 20. In addition, a plurality of support projections 136 are integrally formed on and project upwardly from the upper surface of the chassis 20. The clamp fingers 134 and projections 136 are constructed and positioned to detachably secure the circuit board 22 to the chassis 20. It should be apparent that the clamp fingers 134 are arranged to clamp the edges of the circuit board 22, with the bottom of the circuit board being supported on the projections 136, as shown partially in FIG. 6.

The chassis 20 is also formed with a plurality of integral ribs 138a, 138b, 138c projecting from one edge thereof, and a pair of resilient fingers 140a, 140b extending upwardly from the chassis adjacent the opposite edge, as shown in FIG. 2. The ribs 138a, 138b, 138c are designed to fit within corresponding notches appropriately located on the inner surface of the lid sidewall 142, while the ends of the fingers 140a, 140b are designed to fit within a pair of notches 144a, 144b, respectively, located on the inner surface of the lid sidewall 146. By initially fitting the ribs 138a, 138b, 138c into their corresponding notches in the sidewall 142, and then rotating the chassis 20 until the ends of the fingers 140a, 140b snap into place within the notches 144a, 144b, the chassis 20 is securely connected to the lid 18. As shown in FIG. 2, a notch 148a, 148b is provided adjacent each finger 140a, 140b. The notches 148a, 148 allow a suitable tool to be used to force the ends of the fingers 140a, 140b out of their respective notches 144a, 144b, whereby the chassis 20 can thereafter be removed from the lid 18.

Returning to FIG. 7, it is seen that the lid sidewall 142 is provided with cut-outs 150, 152 to allow passage of power and data lines. Often times, the power source and/or PC are positioned on the side of the reader opposite from the cut-outs 150, 152. The reader 10 is designed to allow passage of the power and data lines across the reader 10, without the lines interfering with the operation of the reader 10. As shown in FIGS. 1 and 4, the legs 24, 26 of the base 12 have cut-outs 154, 156 that allow the data and/or power lines to pass underneath and across the reader from one side to the other, with the reader 10 remaining flat. Moreover, the bottom surface of the base 12 is provided with a retainer 158, preferably comprising a pair of spaced ribs, which can receive and frictionally hold the data and/or power lines as they pass underneath the reader 10, thereby reducing strain on the lines.

FIG. 1 illustrates the upper housing assembly 14 as including a window 160 formed in the lid 18. The window 160 displays a light indicating an operational status of the reader 10. Positioned directly behind the window 160 is a light pipe 162 (shown in FIG. 2) that is mounted on the circuit board 22. The light pipe 162 projects a plurality of different colored lights that are viewed through the window 160, with each light color indicating a specific operational status of the reader. For example, a green light can indicate that the reader 10 is ready to accept a test card, a red light can indicate an error, and a yellow light can indicate that the reader is scanning a test card.

Further, with reference to FIG. 2, the reader 10 is designed to reduce strain on a data cable 164 that is used to connect the reader 10 to a PC. The chassis 20 is provided with a series of cable guides 166 that define a generally "question mark"-shaped path for the cable 164. Further, a "question mark"-shaped groove 168 is formed in the chassis 20 which receives the bottom portion of the cable 164. The guides 166 and groove 168 help to reduce strain on the cable 164, which reduces cable wear and improves reliability of the reader 10.

During operation of the reader 10, test cards are fed one-by-one into the reader through the input slot 16. When a test card is inserted, the drive wheel 100 is rotated by the motor 102 so as to drive the test card past the scanning mechanism 92. If necessary, such as when a scanning error occurs, the motor 102 can be reversed to drive the wheel 100 in the opposite direction, thereby causing the test card to be transported back to the input slot. Under normal operation, the test cards will be driven by the wheel 100 through the outlet slot on the opposite side of the reader 10.

As indicated, the cards are fed one at a time into the reader 10. Feeding can be accomplished manually by hand. Alternatively, an input hopper can be associated with the reader 10 for automatically feeding cards into the reader. The input hopper would hold a plurality of cards waiting to be scanned, and feed the cards sequentially into the reader 10. The input hopper could be a stand alone unit separate from the reader, or it could be constructed as part of the reader 10. Similarly, an output hopper could be associated with the reader outlet for collecting cards after they are scanned.

The reader 10 has been described herein as having its scanning mechanism 92 within the upper housing assembly 14. It is to be realized that the scanning mechanism 92 and its associated electronics could instead be positioned in the base 12. Likewise, the drive wheel 100 and motor 102 could instead be positioned in the base 12, rather than in the upper housing assembly 14.

While a particular embodiment of the invention has been described, it will be understood by those skilled in the art that the invention is not limited by the application, embodiment or the particular devices disclosed and described herein. It will be appreciated that other devices that embody the principles of this invention and other applications therefore other than as described herein can be configured within the spirit and intent of this invention. The apparatus described herein are provided as only examples that incorporate and practice the principles of this invention. Other modifications and alterations are well within the knowledge of those skilled in the art and are to be included within the broad scope of the appended claims.

What is claimed is:

1. An optical mark reader comprising a base and an upper housing assembly that define a card path along which a card to be read travels; and said base and said upper housing assembly are detachably connected to each other by a quick connect/disconnect fastening system that is integral with said base and said upper housing assembly, wherein said base includes an upper side facing the upper housing assembly and a bottom side that faces downward during use, and wherein the fastening system includes a resilient lever that extends beneath the bottom side and is accessible from beneath the reader.

2. An optical mark reader according to claim 1, wherein said quick connect/disconnect fastening system comprises a bayonet-type coupling.

3. An optical mark reader according to claim 1, wherein at least one of said base and said upper housing assembly includes a scanning mechanism associated therewith.

4. An optical mark reader according to claim 3, wherein said quick connect/disconnect fastening system comprises a plurality of flanges integrally connected to said upper housing assembly or said base, and a plurality of slots on the other of said upper housing assembly or said base that are positioned and sized to interact with said flanges to connect said base and said upper housing assembly.

5. An optical mark reader according to claim 4, wherein said flanges are integrally connected to said upper housing assembly, and said slots are formed in said base.

6. An optical mark reader according to claim 5, wherein the resilient lever is connected to said upper housing assembly, said lever being engaged with one of said slots when said upper housing assembly and said base are connected so as to prevent relative movement between said upper housing assembly and said base.

7. An optical mark reader according to claim 5, wherein said scanning mechanism is associated with said upper housing assembly.

8. An optical mark reader according to claim 1, wherein said card path includes a tapered inlet.

9. An optical mark reader according to claim 8, wherein said inlet is tapered horizontally and vertically.

10. An optical mark reader according to claim 9, wherein the horizontal and vertical tapers of said inlet are formed by curved surfaces.

11. An optical mark reader according to claim 1, wherein said card path includes a pair of guide walls positioned opposite each other, said guide walls partially defining said card path therebetween.

12. An optical mark reader according to claim 11, wherein said guide walls extend from adjacent an inlet end of said base to adjacent an outlet end of said base.

13. An optical mark reader according to claim 12, wherein said guide walls include flared sections adjacent the inlet end.

14. An optical mark reader according to claim 12, further comprising a surface disposed between said guide walls, said surface is generally convex between the inlet end and the outlet end.

15. An optical mark reader according to claim 12, further comprising a plurality of projections on said surface adjacent said inlet end.

16. An optical mark reader according to claim 1, wherein said upper housing assembly comprises a lid, a chassis, and a circuit board; and wherein said circuit board is detachably connected to said chassis, and said chassis is detachably connected to said lid.

17. An optical mark reader according to claim 1, wherein said upper housing assembly includes a scanning slot through which scanning of said scanning mechanism occurs, and further including a drive wheel positioned adjacent to and to the side of said scanning slot.

18. An optical mark reader for reading bubble cards, comprising:
a housing having a card path along which a card to be read travels, said card path being defined by a pair of guide walls that are spaced apart along at least a portion of said guide path by a distance that is minimally greater than the width of a bubble card whereby the guide walls are positioned closely adjacent to the side edges of the card at that portion of the card path; a scanner associated with said housing for scanning a card input into said housing; and a drive mechanism within said housing for transporting a card along the card path and through said housing, said drive mechanism including a single drive wheel disposed adjacent to said scanner and positioned at a decentralized location of said card path.

19. An optical mark reader according to claim 18, wherein said drive wheel is positioned adjacent an end of said scanner.

20. An optical mark reader according to claim 18, further including an idler roller positioned opposite said drive wheel.

* * * * *